July 5, 1960     I. GOODBAR     2,943,533
APPARATUS FOR PHOTOGRAPHING AND EXHIBITING
A SUCCESSION OF PICTURES
Filed Oct. 3, 1958     3 Sheets-Sheet 1

INVENTOR.
ISAAC GOODBAR
BY
ATTORNEYS

July 5, 1960
I. GOODBAR
2,943,533
APPARATUS FOR PHOTOGRAPHING AND EXHIBITING
A SUCCESSION OF PICTURES
Filed Oct. 3, 1958
3 Sheets-Sheet 2
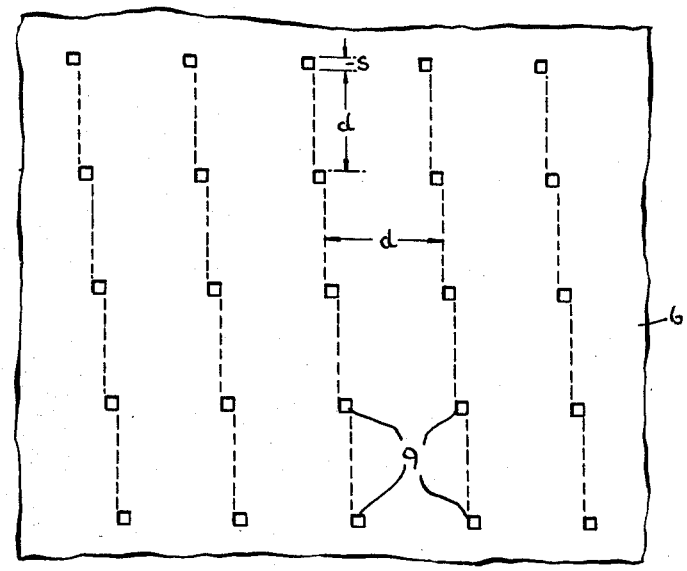
Fig. 2.
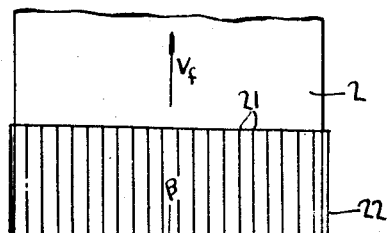
Fig. 3.
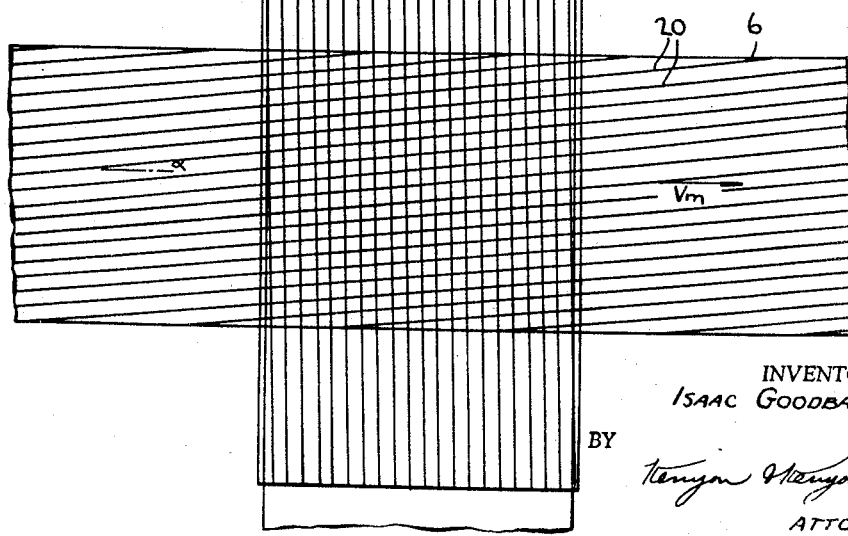
INVENTOR.
ISAAC GOODBAR
BY
ATTORNEY July 5, 1960

I. GOODBAR 2,943,533

APPARATUS FOR PHOTOGRAPHING AND EXHIBITING
A SUCCESSION OF PICTURES

Filed Oct. 3, 1958

INVENTOR.
ISAAC GOODBAR

BY
Kenyon & Kenyon
ATTORNEYS

United States Patent Office 2,943,533
Patented July 5, 1960

2,943,533

APPARATUS FOR PHOTOGRAPHING AND EXHIBITING A SUCCESSION OF PICTURES

Isaac Goodbar, 420 Riverside Drive, Apt. 2G,
New York 25, N.Y.

Filed Oct. 3, 1958, Ser. No. 765,134

10 Claims. (Cl. 88—16)

This invention relates to an apparatus for photographing and exhibiting a succession of pictures and more particularly relates to apparatus for photographing and exhibiting a succession of pictures, in a manner somewhat similar to motion picture photography, which pictures are individually composed from a plurality of exposed dots positioned on a light sensitive film.

The pictures photographed and exhibited by use of the apparatus of the present invention are composed of a plurality of dots of a given size which are spaced from one another by a distance not larger than the minimum detail desired in the finished picture. Basically this apparatus provides a film with a perforated scanning mask adjacent thereto. During the photographing step the scanning mask is positioned between the film and the object to be photographed so that only that portion of the film is exposed which is directly behind the perforations and as the film and mask are moved relatively to one another a succeeding and different area of the film is exposed with each change in position of the perforations with respect to the film. Thus, all or a part of any length of the film may be exposed during such photographing step. In general, this film can then be viewed to exhibit the pictures exposed thereon by transmitting light through the film and a similarly perforated mask positioned on either side of the film and successive pictures can likewise be viewed by moving the film and mask relatively to one another whereby the viewer will only see the picture behind the perforations at any given time.

Prior to this invention a somewhat similar apparatus was patented in U.S. Patent No. 2,596,740 which discloses a circular scanning disk having a number of apertures arranged in a spiral extending outwardly from the center of the disk. In this prior art apparatus the successive pictures are composed of dots and both the exposure and the exhibition of the pictures is accomplished by rotating the scanning disk while the film remains stationary.

The present invention represents a very substantial advance over this prior art device as will be developed more fully hereinafter but the primary advantage of the present invention is that in its preferred embodiment where both the film and the perforated mask are moved simultaneously the number of pictures taken by the camera portion of the apparatus is only limited by the length of the roll of film used whereas in the prior art apparatus the number of pictures is limited to a relatively low number, such as 900 as described in the prior art patent, without subjecting the film to double exposure.

It is, therefore, a primary object of the present invention to provide apparatus whereby a continuous succession of pictures can be taken and exhibited while the total number of pictures that can be taken or exhibited before the film need be changed is limited only by the length of the film.

It is another object of this invention to provide such apparatus which is inexpensive and which is capable of taking and exhibiting a great many more pictures per length of film than comparable motion picture apparatus.

It is another object of this invention to provide such apparatus which can be readily adjusted through wide ranges by changing the speed of movement of the film or scanning mask to vary the size and placement of the perforations to thus provide a wide range of variations in the speed with which the recording and exhibiting of the subjects photographed and a wide range of variations in the detail and clarity of the individual pictures.

It is another object of the present invention to provide such apparatus which will exhibit the successive pictures under almost any environmental lighting without need for darkening the exhibiting area or otherwise changing its lighting requirements.

It is another object of the present invention to provide such apparatus which can utilize film which is inexpensive and may distort through use or due to climatic changes so that the register of the scanning mask with the film at the time the film is exhibited is not exactly the same as when the film was exposed.

It is another object of the present invention to provide such apparatus which is simple to operate and can be readily adapted for home use without need for trained or professional operating personnel.

It is still another object of the present invention to provide such apparatus which will record and exhibit a succession of pictures without flickering or distortions whereby any movement or animation of the subjects photographed will be more completely and realistically reproduced than with known motion picture equipment.

Further objects and advantages of the present invention will be appreciated while reading the following description in conjunction with the accompanying drawings, wherein:

Figure 2 is a greatly enlarged segment of the scanning mask;

Figure 3 is similar to Figure 2 but the enlargement is not as great;

Figure 5 is a diagrammatic view of the film and a scanning mask having light transmitting lines thereon adapted to move perpendicular rather than parallel to the film to produce a scanning effect in conjunction with a substantially perpendicular disposed plurality of stationary light transmitting lines.

General description of apparatus

Figure 1:
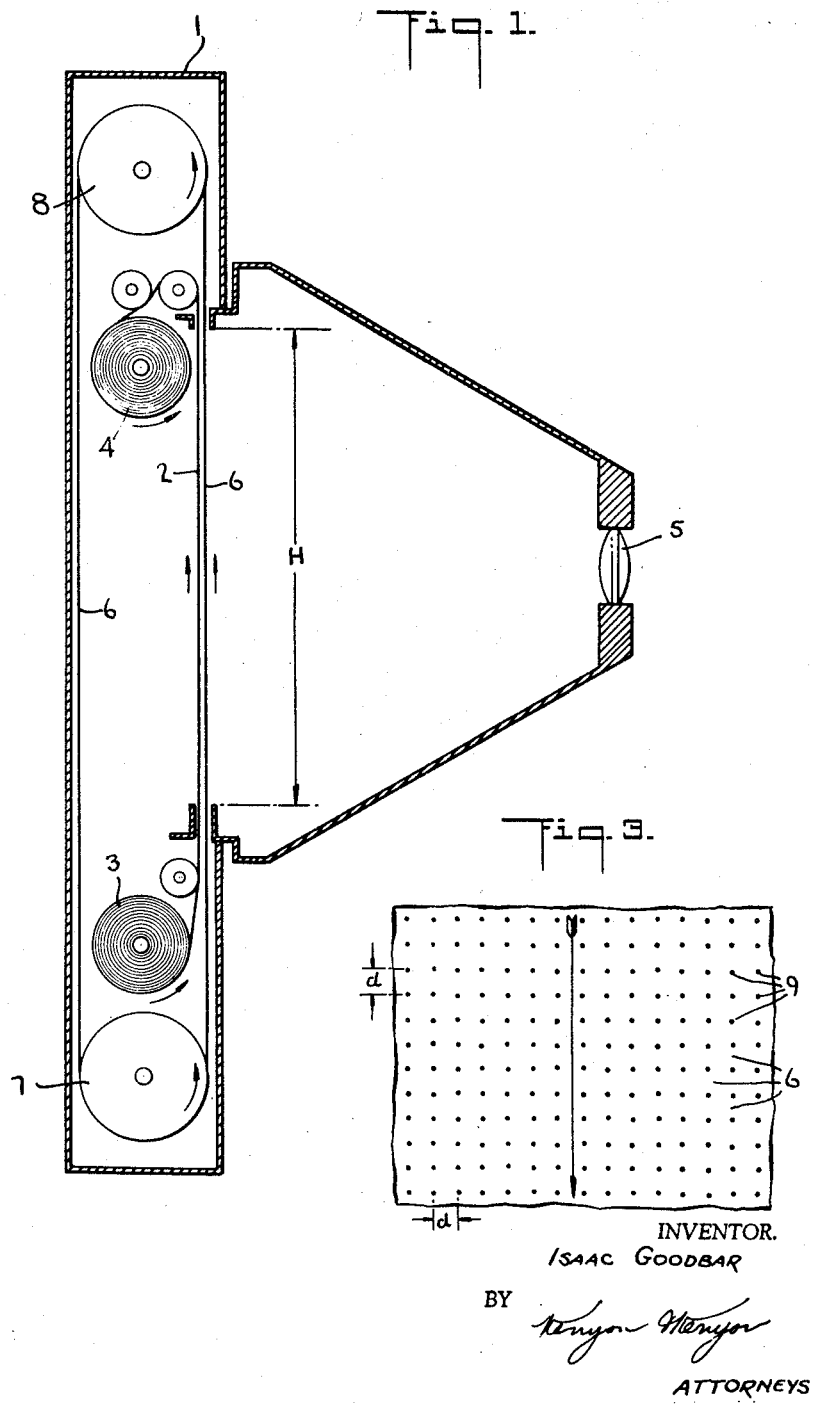
Figure 1 is a diagrammatic cross-sectional view of a camera constructed in accordance with the present invention.

Referring to Fig. 1, the camera is enclosed as shown at 1 in the ordinary manner. In this embodiment, the opposing ends of the film 2 are wound on two spools 3, 4, and it is adapted to unwind from the lower spool 3 onto the upper spool 4. Intermediate these spools the film passes across an image aperture in the camera, the height of this aperture being shown as H in Fig. 1. A constant or variable speed motor (not shown), is used to unwind the film 2 from spool 3 and wind it onto spool 4 in a known manner, to accomplish this movement of the film across the image aperture. This film 2 may have a perforated track along one or both edges thereof which tracks may be used for feeding the tape, regulating the speed of the tape, etc. An objective lens 5 is positioned at a set distance from the film 2 in the ordinary manner to transmit a focused image onto the film as it passes the image aperture. It will be appreciated that any known means of producing an image on a film may be substituted for the lens 5. This camera also has a shutter (not shown) which is opened when the camera is placed in operation and closed when it is not in use.

Figure 4:
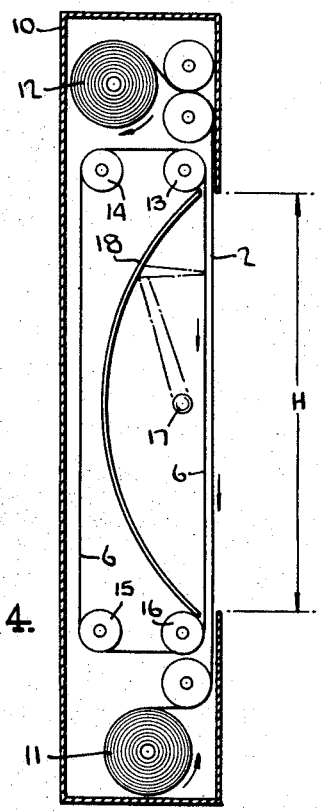
Figure 4 is a diagrammatic cross-sectional view of an apparatus adapted to exhibit the film.

The scanning mask 6 in this embodiment constitutes an endless tape which is juxtaposed adjacent the film on the side toward the lens 5. This scanning mask 6 has a width substantially the same as or slightly greater or smaller than the width of the film 2 and is mounted on two spindles 7, 8 one or both of which are powered by a constant or variable speed motor (not shown) adapted to continuously move the scanning mask across the image aperture in the same direction as the film 2 but at a slightly different speed as will be explained hereinafter. As illustrated in Figures 3 and 4 this scanning mask 6 is opaque but has a great many light transmitting apertures or windows 9 extending therethrough which will herein be termed perforations.

Thus the only areas of the film 2 which are exposed to the image transmitted to the image aperture when this camera is in operation are those areas which are aligned with these perforations 9. It will be appreciated that these areas that are exposed at any given instant are very small as compared to the total area of film 2 that is in the image aperture and therefore the picture photographed at such instant is composed of a great many exposed areas or dots on the film.

As explained in detail hereinafter the succeeding perforations are not vertically aligned and as the film and mask are moved with relation to one another succeeding pictures are recorded on the film thus eventually substantially covering the film with exposed areas or dots but as also explained hereinafter never double exposing any given area. After this film is developed these exposed dots are meaningless and they must be viewed through a scanning mask which in effect reproduces the original exposure conditions and thus exhibits the successive pictures much as they were taken.

Referring to Figure 4 an exhibiting apparatus is diagrammatically shown having an enclosure 10 with a viewing aperture in one surface thereof corresponding in height to the image aperture of the camera. In this exhibiting apparatus the opposing ends of the film 2 are again wound on spools 11, 12 by means of a constant or variable speed motor (not shown) and is guided intermediate these spools across the viewing aperture. A scanning mask 6, similar to the scanning mask used in the camera, is juxtaposed adjacent the film 2 on the opposite side thereof from the viewing aperture. This scanning mask 6 is again illustrated as an endless tape mounted on a plurality of spindles 13, 14, 15, 16 at least one of which is driven by a constant or variable speed motor (not shown) whereby the scanning mask 6 can be moved in the same direction as the film 2 past the viewing aperture and with the same relative speed with respect to the film as in the camera apparatus. Positioned behind the scanning mask 6 as it passes across the viewing aperture is an illuminating source, such as a bulb 17, which is positioned in a reflector 18 and adapted to provide substantially uniform illumination to the rear side of the scanning mask 6. When this exhibitor apparatus is in operation the only illumination that is transmitted through the film 2 and thus the only areas of the film that are seen by the viewer are those areas that are aligned with the scanning mask perforations 9 at any instant. Thus when the scanning mask 6 and film 2 are synchronized as they were in the camera the exhibitor will reproduce the successive pictures just as the film "saw" them during the photographing operation.

*Detailed description of scanning mask*

Referring more particularly to Figures 2 and 3 the perforations 9 in the scanning mask 6 may be arranged in any repetitive pattern. A very satisfactory pattern is one in which the perforations 9 are arranged in repetitive patterns with the perforations displaced from one another at the vertices of a rhombus or parallelogram. As will be seen from Figure 2 assuming that the scanning mask 6 is adapted to move vertically each perforation 9 linearly displaced along the mask is displaced transversely from the next succeeding perforation the width of a perforation. This displacement can be either to the right or to the left. This displacement of the perforations 9 results in rows of perforations which are inclined from the vertical and as a result of this inclination it will be appreciated that as the mask 6 is moved no area behind it will be exposed twice until the mask has moved a distance $d^2/s$ where $d$ represents the distance between the rows of perforations and $s$ represents the width of a perforation. Thus by so inclining these rows the number of pictures that can be recorded on a film behind the mask prior to double exposure and assuming that the film is not moving are $d^2/s^2$. Assuming, as shown in Figure 2, that $d$ also represents the vertical distance between adjacent perforations 9, it will also be appreciated that the number of pictures that can be recorded on a given length of film can be controlled through a wide range by changing the size of the perforations, i.e. the dimension $s$, the only limitation as a practical matter being that $s$ cannot be smaller than the minimum detail that can be recorded on the film. The distance $d$ can also be varied within limits—the largest value of $d$ being dependent on the minimum detail desired in the picture.

*Detailed description of scanning mask and film movements*

As indicated above the camera and exhibitor apparatus of the present invention can be used with the film standing still and the scanning mask moving as a succession of pictures will be recorded or exhibited by relative movement of the scanning mask with respect to the film. When the apparatus is used in this manner, however, the number of pictures is limited to the number that can be recorded on a given length of film as determined by the formula $d^2/s^2$ as indicated above before the film is double exposed. This use of the apparatus does, however, have utility where it is desired to repeat the same sequence of pictures over and over as with an advertising display where the length of the film H would be installed in the viewing aperture of the exhibitor and the scanning mask would continuously scan this film to repeat the sequence of pictures. When used in this manner it will be appreciated that there would not be any double exposure of any picture as the film length is limited to H or less.

When only the mask is moved it is possible to obtain continuous scenes of any duration but the mask must move at least the full distance H when a total of $d^2/s^2$ pictures are exposed because the distance is $d^2/s$ must be $\geq$H or $$\frac{H}{d} = N \leq \frac{d}{s}$$

and thus limits the definition of the picture, in practice, to something around 30 lines which is unacceptable (even the lower television standards are around 150 to 200).

This shows that without moving both the film and scanning mask, it is impossible to obtain satisfactory definition. Moving both film and mask our definition is limited, instead by our Formula 4, hereinafter $$\sqrt{N} \leq \frac{d}{s}$$

i.e., which, even for $$\frac{d}{s} = 18$$

makes $N > 300$.

Thus, a more usual use of the present apparatus, however, is one in which the number of pictures is limited only by the total length of the film. The ability of this apparatus to record or exhibit as the case may be this large number of pictures is due to the fact that both the film and the scanning mask are moved simultaneously while still having relative movement with respect to each other so that a continuous sequence of pictures will be recorded or exhibited. It is this ability to exhibit a great many pictures using a single long film before having to change films that makes the apparatus of the present invention a very marked advance over known devices using circular films and scanning disks where the number of pictures that can be recorded or exhibited between changes of film are even more limited than in the present apparatus where only the scanning mask moves as described above.

When the present apparatus is used in the preferred manner with both the film and scanning mask in motion both of these will travel in the same direction with the scanning mask moving either faster or slower than the film. When so used the speeds of the film and mask must be controlled by the following limitations.

The speed of the film must be at least as fast as the speed determined by the following formula to avoid double exposure of the film:

(1) $$V_f \min. = \frac{Hs^2}{ed^2}$$

where:

$H$ = height of the picture in the direction of movement of the film
$e$ = exposure time desired
$s$ = dimension of perforations
$d$ = distance between perforations The film speed must not be greater than the speed derived from the following formula to avoid blurring of the pictures:

(2) $V_f \max. = d/e - s/e$ (when the mask is moving faster than the film)
and:
$= d/e + s/e$ (when the mask is moving slower than the film)

The scanning mask speed is always equal to:

(3) $$V_m = V_f + s/e$$

As to the quality of the pictures if N represents such quality and is comparable to the number of lines of perforation in the height H of the picture viewed at any instant, then the above formulas impose a limitation according to the following approximate formula:

(4) $$d/s \cong \sqrt{N}$$

To make these matters clear an example will be considered:

H: height of picture to be obtained: 750 millimeters
e: exposure time = one twentieth of a second or 0.05 sec.
N: number of lines = 300 (television quality)
d: minimum detail desired on the picture; 2.5 millimeters.

Formula 5 gives:

$s \leq 0.145$ mm.

and, if the maximum value of $s$ is adopted:

$V_f = V_f \max. = 50$ millimeters per second
$V_m = 47.1$ millimeters per second or 52.9 millimeters per second The speed required in this example shows that a full half hour of film can be contained on a roll only 90 meters long.

It will be appreciated that the film on which the subject is originally photographed may be considerably smaller than indicated above with the above representing an enlarged version if desired. Prior to enlargement the following example of sizes and speeds is more realistic.

H: 90 millimeters (film for 90 x 120 millimeters pictures)
d: 0.18 millimeters
s: 0.008 millimeters
$V_f$: 3.6 millimeters per second
$V_m$: 3.4392 millimeters per second A full half hour of action can be photographed in a roll of film having a length of only 6.48 meters.

Other embodiments of the invention

While keeping within the spirit of this invention there are a number of other embodiments of the present invention. In one of these embodiments a somewhat different apparatus for scanning the film is used whether in the camera or the exhibitor.

Referring to Figure 5 a film 2 and scanning mask 6 combination is diagrammatically illustrated and can be substituted into the apparatus previously described by simple changes in structure and mechanism. In this embodiment the scanning mask 6 moves substantially perpedicular to the film 2 and the same scanning effect as with the perforated scanning mask is achieved by a number of parallel light transmitting lines disposed on the scanning mask disposed at an angle $\alpha$ with the linear edge of the mask criss-crossing with a similar number of light transmitting lines 21 disposed at an angle $\beta$ with the linear edge of a length of stationary tape 22 which is positioned just above or just below the scanning mask 6 and perpendicular thereto. This embodiment was devised to overcome the need for a perforated scanning mask which is somewhat difficult and expensive to produce.

It is also contemplated that the scanning operation may be done electronically much as it is done in an ordinary television or radar tube by using a circuit which will move a light beam, hesitate, and move, with the hesitations creating a pattern on the film similar to the perforations of the scanning mask.

It will be realized that if the pictures are taken in color they will likewise be viewed in color. It is also contemplated that regardless of the means used for scanning, the camera scanning mask can be adapted to expose color sensitive black and white film in such a manner as to produce color reproductions of the scenes photographed. This can be done by alternately using filters which will individually pass one of a set of primary colors in adjoining perforations on the camera scanning mask whereby only those colors "seen" by the film through the filters will be recorded thereon and will likewise be reproduced thereby.

Figure 6:
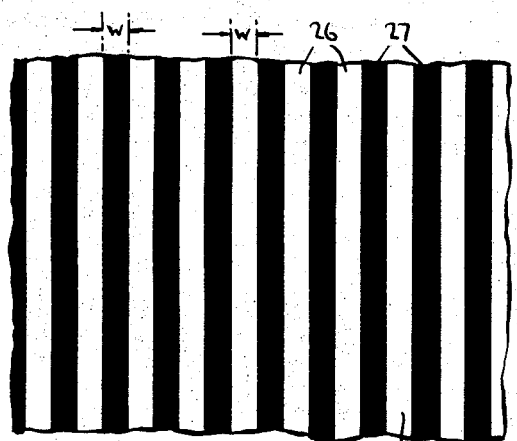
Figure 6 is a diagrammatic section of a mask adapted to modify the camera apparatus to adapt it to take a portion of a stereophotograph.

It is further contemplated that two or more of the present apparatus may be used simultaneously to produce stereoscopic reproductions of scenes. For instance, when a stereoscopic picture is taken using two cameras such as that shown in Fig. 1, both being located on the same horizontal plane, an additional mask 25 as shown in Figure 6 is interposed between the film 2 and the objective lens 5. This mask has alternate parallel transparent and opaque vertical bands 26, 27 of a width $w$ smaller than $d$. A mask 25 will be positioned in each camera with the transparent bands 26 in one corresponding exactly with the opaque bands 27 in the other.

Figure 7:
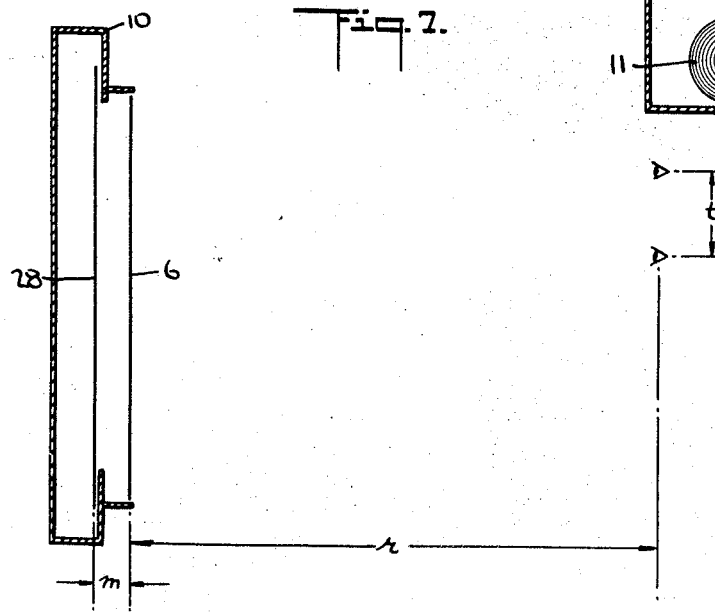
Fig. 7 is a diagrammatic illustration of a stereophotographic viewing apparatus.

The camera will then be operated in the manner described above and after the films have been exposed, they are processed or printed onto a single strip as shown at 28 in Figure 7. When this strip 28 is positioned in a viewing or exhibiting apparatus at a distance $m$ behind the scanning mask 6 it will be possible for a viewer, sitting at approximately the distance $r$ from the exhibiting apparatus, as determined by the formula:

(5) $$r = \frac{mw}{t}$$

where:

$m$ = the distance between the scanning mask 6 and the strip 28 (see Figure 7); and
$t$ = the distance between the eyes of the person.

to see with each eye the scene photographed by the corresponding camera and thus witness a stereoscopic sequence of pictures.

Advances of the present invention

One of the primary advantages of the apparatus of the present invention as compared to known movie apparatus is that when the present apparatus is used there is a smooth, non-stop transition from one picture to the next which tends to blend each picture with the next and record or exhibit the entire action whereas with a movie camera there is necessarily a start-stop action between frames and regardless of the number of frames per second there is a lack of recordation of a portion of the scene. Further with known motion picture apparatus slowly rotating wheels are apt to be reproduced rotating in the wrong direction and this never happens with the present equipment.

As compared to the somewhat similar type of apparatus disclosed in U.S. patent, No. 2,596,740 wherein the scanning mask and film are in the form of disks, the present invention has a great many advantages. As pointed out previously a great many more pictures and thus a great many more minutes of pictures can be recorded or exhibited before changing films. This difference in performance is so marked that it is analogous to a movie camera versus a still, single exposure camera and makes it possible to photograph long continuous sequences of scenes with the apparatus of the present invention which can later be exhibited in the same length of time, in a shorter time or in slow motion if desired, even if they were not originally intended for such purpose. Further, with the disk type film and scanning mask it is essential that the scanning mask perforations register with the film during exhibition in exactly the same manner as when the scene was photographed to avoid distorting the picture. With applicant's apparatus, on the other hand, it is possible and in fact desirable to either make the perforations on the camera smaller than those on the exhibitor mask or vice versa whereby the picture will be exhibited in true likeness even though the register between the film and scanning mask is not exactly the same during the photographing and exhibiting operations. It is also possible to use square perforations in the camera mask and rectangular perforations in the exhibitor mask to take care of the problem of lack of true register due to greater expansion or contraction of the film in the direction of the long sides of the rectangular perforations. Not only is this a great advantage in taking care of slight inaccuracies in the most expensive equipment but also it permits the use of less expensive apparatus and supplies. The latter of which may vary from manufacture to manufacture and may even vary due to climatic changes, processing of hte film, extensive use and stretching of the film, etc. As a practical matter this ability of applicant's apparatus to handle such lack of perfect register problems makes the difference between a feasible and a non-feasible apparatus from a commercial standpoint.

Another great advantage of the present apparatus over the disk type apparatus is that in the disk type device in order to get 1/10" definition it is necessary to use 0.03" perforations in the scanning mask in order to get as many as 900 pictures before double exposure. With this mechanism it requires an illumination 900 times brighter than what is to be seen when exhibiting the pictures and at the very least this requires dark room showings, whereas with the apparatus of the present invention the perforations can be much larger which simply entails the use of more film to get the same detail but more film is available in roll form without need for changing the film and consequently with the larger perforations the amount of illumination can be greatly reduced and the showings can be in environmental light.

It is still a further advantage of the present invention that the film used in the apparatus may be formed from inexpensive materials such as ordinary paper, plastics, etc., and such film can be inexpensively printed by use of known inexpensive printing methods such as known ink-printing means.

This application is a continuation-in-part of applicant's copending application Serial No. 607,108, filed August 30, 1956.

Having thus described certain embodiments of the present invention, I claim:

1. An apparatus for photographing a succession of pictures comprising an enclosure having an image aperture positioned therein, a lens disposed in a wall of said enclosure and spaced from said image aperture, film spools disposed above and below said image aperture to support a photographic film, means for guiding said film across said image aperture intermediate said spools, an endless perforated scanning mask mounted with a portion of the scanning mask passing across said image aperture juxtapositioned adjacent the film on the side toward the lens, and a means for moving said film and scanning mask across said image aperture at different relative speeds, the difference in speed between the film and scanning mask being $s/e$ where $s$ is the dimension of the perforations in the scanning mask and $e$ is the film exposure time.

2. The apparatus of claim 1 wherein the perforations in the scanning mask are alternately covered with light filters which will pass one of a set of primary colors and the film is color sensitive.

3. An apparatus for photographing a succession of pictures comprising a camera-like enclosure, a lens disposed in one wall of said enclosure, an image aperture formed within said enclosure spaced from the lens, means for supporting a film having a length substantially greater than its width, a perforated scanning mask, said film and scanning mask disposed with a portion of their lengths in juxtaposition to each other across said image aperture and a means for moving said film and scanning mask across said image aperture with relative motion between them.

4. An apparatus for exhibiting a succession of pictures comprising an enclosure having a viewing aperture positioned in a wall thereof, a film spool disposed above and below said viewing aperture with opposing ends of an exposed and developed photographic film wound thereon, means for guiding said film across said viewing aperture intermediate said spools, an endless perforated scanning mask, spindles above and below said spools with said scanning mask mounted thereon with a portion of the scanning mask passing across said viewing aperture juxtapositioned adjacent the film, a light source disposed within said enclosure behind said film and scanning mask, and a means for moving said film and scanning mask across said viewing aperture, said means for moving the film and scanning mask across the viewing aperture arranged to move the film at a different speed from the speed of said scanning mask.

5. The apparatus of claim 4 wherein the perforations in the scanning mask are alternately covered with light filters which will pass one of a set of primary colors.

6. An apparatus for exhibiting a succession of pictures comprising an enclosure having a viewing aperture in one wall thereof, means for supporting an exposed and developed film having a length substantially greater than its width, a perforated scanning mask, said film and scanning mask disposed with a portion of their lengths in juxtaposition to each other across said viewing aperture, a light source disposed within said enclosure behind said aperture on the opposing side of said film and scanning mask, and a means for moving said film and scanning mask across said viewing aperture with relative motion between them.

7. An apparatus for photographing a succession of pictures comprising a camera-like enclosure, a lens disposed in one wall of said enclosure, a viewing aperture formed within said enclosure spaced from the lens, a plate positioned across said aperture having a plurality of parallel light transmitting lines therein disposed linearly at a slight angle to said aperture, means for supporting a film having a length substantially greater than its width, a scanning mask having a plurality of parallel light transmitting lines therein disposed at about a 90° angle to said plate lines and in juxtaposition thereto, said film and scanning mask disposed with a portion of their lengths in juxtaposition to each other across said viewing aperture and a means for moving said film and scanning mask across said viewing aperture at right angles to each other at different speeds.

8. An apparatus for exhibiting a succession of pictures comprising an enclosure having a viewing aperture in one wall thereof, a plate positioned across said aperture having a plurality of parallel light transmitting lines therein disposed linearly at a slight angle to said aperture, means for supporting an exposed and developed film having a length substantially greater than its width, a scanning mask having a plurality of light transmitting lines therein disposed at about a 90° angle to said plate lines and in juxtaposition thereto, said film and scanning mask disposed with a portion of their lengths in juxtaposition to each other across said viewing aperture, a light source disposed within said enclosure behind said aperture on the opposing side of said film and scanning mask and a means for moving said film and scanning mask across said aperture at right angles to each other at different speeds.

9. An apparatus for exhibiting a succession of pictures comprising an enclosure having a viewing aperture in one wall thereof, means for supporting an exposed and developed film having a length substantially greater than its width, a perforated scanning mask, said film and scanning mask disposed with a portion of their lengths in juxtaposition to each other across said viewing aperture, said film having a plurality of exposed areas thereon which are smaller than the mask perforations, a light source disposed within said enclosure behind said aperture on the opposing side of said film and scanning mask, and a means for moving said film and scanning mask across said viewing aperture with relative motion between them.

10. An apparatus for exhibiting a succession of pictures comprising an enclosure having a viewing aperture in one wall thereof, means for supporting an exposed and developed film having a length substantially greater than its width, a perforated scanning mask, said film and scanning mask disposed with a portion of their lengths in juxtaposition to each other across said viewing aperture, said film having a plurality of exposed areas thereon which are larger than the mask perforations, a light source disposed within said enclosure behind said aperture on the opposing side of said film and scanning mask, and a means for moving said film and scanning mask across said viewing aperture with relative motion between them.

References Cited in the file of this patent

UNITED STATES PATENTS

| | | |
|---|---|---|
| 1,260,682 | Kanolt | Mar. 26, 1918 |
| 2,089,155 | Walton | Aug. 3, 1937 |
| 2,112,002 | Walton | Mar. 22, 1938 |
| 2,596,740 | Tuttle et al. | May 13, 1952 |

FOREIGN PATENTS

| | | |
|---|---|---|
| 1,084,970 | France | July 21, 1954 |

OTHER REFERENCES

"Improvements in High-Speed Motion Pictures by Multiple-Aperture Focal-Plane Shutters," Journal Society Motion Picture Engineers, vol. 53, pages 462–468, November 1949, Tuttle, F. E.

UNITED STATES PATENT OFFICE

CERTIFICATE OF CORRECTION

Patent No. 2,943,533                              July 5, 1960

Isaac Goodbar

It is hereby certified that error appears in the printed specification of the above numbered patent requiring correction and that the said Letters Patent should read as corrected below.

Column 7, line 66, for "0.03″" read -- .003″ --.

Signed and sealed this 10th day of January 1961.

(SEAL)
Attest:

KARL H. AXLINE
Attesting Officer

ROBERT C. WATSON
Commissioner of Patents